DYNAMIC MAGNETIC MEMORY TRANSDUCER POSITIONING APPARATUS

Filed Oct. 22, 1965 7 Sheets-Sheet 1

INVENTOR.
CLARENCE R. LINSLEY
BY Joseph Dwyer
ATTORNEY

Jan. 20, 1970 C. R. LINSLEY 3,491,350

DYNAMIC MAGNETIC MEMORY TRANSDUCER POSITIONING APPARATUS

Filed Oct. 22, 1965 7 Sheets-Sheet 3

Jan. 20, 1970 C. R. LINSLEY 3,491,350

DYNAMIC MAGNETIC MEMORY TRANSDUCER POSITIONING APPARATUS

Filed Oct. 22, 1965 7 Sheets-Sheet 6

United States Patent Office 3,491,350

Patented Jan. 20, 1970

3,491,350
DYNAMIC MAGNETIC MEMORY TRANSDUCER POSITIONING APPARATUS

Clarence R. Linsley, La Crescenta, Calif., assignor to Singer-General Precision, Inc., a corporation of Delaware Filed Oct. 22, 1965, Ser. No. 501,352
Int. Cl. G11b 5/00
U.S. Cl. 340—174.1 5 Claims

ABSTRACT OF THE DISCLOSURE

Apparatus employing springs for supporting the "flying" read/write transducers of a rotating disc magnetic memory, in any of three positions with respect to the surface of the disc: a fully retracted position for servicing, a lightly spring-urged position during start-up and shut-down, and a more strongly spring-urged position at operating speed.

This invention relates to dynamic magnetic memories used with electronic computers, and more particularly to improved apparatus employed with a mass memory system for maintaining transducers in and retracting transducers from positions for their dynamic transfer of data.

Due to the advent of mass memory systems, and particularly to disc files which consist of a number of adjacent large magnetizable rotating discs mounted on a common spindle, a need has developed for a reliable, inexpensive and uncomplicated transducer positioning apparatus.

Systems using the principle of floating their transducers upon a gaseous bearing created by the laminar air flow due to the rotation of the disc are clearly explained in U.S. Patent No. 3,177,495, issued Apr.6, 1965, to John A. Felts and U.S. Patent No. 3,197,751, issued July 27, 1965, also to John A. Felts. In such systems, when the discs rotate, the laminar air flow causes the transducers to be forced away from the discs. Therefore, some urging means, such as a spring, must be provided to overcome this air flow and counterbalance the transducer, thereby keeping it as close to the disc surface as possible for well known reasons.

When disc runout, or wobble, occurs, due to imperfections in the manufacture of disc files, the distances between the transducers and the discs will vary if it were not for the floating transducers coacting under spring tension. As can be appreciated, this runout will increase as the diameter of the discs increase, thus a greater amount of force placed upon the transducers is required for the transducers and their shoes to float upon the nearly impenetrable barrier created upon the surface of the disc by the laminar air flow.

Also, it can be appreciated that larger disc file units will naturally create increased vibration, thus the larger force is required upon the shoes so as not to interrupt their data transfer by the varying of the shoe/disc tolerances, thereby disrupting output signals.

As previously stated, springs are employed as the means to overcome the lift produced by the laminar air flow. In the use of these springs increased amounts of force must be used to overcome the laminar air flow created by the ever-higher operating speeds of the discs, necessitated by the demand for data shorter access times. The increased spring force applied to the transducers causes wear on both the discs and transducers and may even score the surface of the disc at slow speeds while stopping and starting. This is because the laminar air flow decreases when the speed of the disc decreases, and the force applied by the transducer springs is greater than that required to break through the laminar air flow.

Also, it can be seen that when a disc file which may have as many as a hundred or more transducers bearing on each disc's surface is started, a large amount of torque is required to raise the speed of the disc to that which is required to suspend the transducers to a floating position.

Another problem encountered is when access to a particular transducer is desired for the purpose of either inspection or repair to damage thereof. With the large discs placed in side by side relationship and the consequently large number of transducers grouped together, as is generally the case, it is virtually impossible for a repairman or inspector to get his hands, tools and other equipment into such confined spaces. Therefore, the need has arisen for a means of easy access to each transducer. This is accomplished by this invention by actual removal of complete banks of transducers from between the discs, thus a means must therefore be provided for actually removing all transducers off the surface of the disc, even when the discs are not rotating. It can be seen that should such a removal be necessary, the transducers in contact with the disc would be difficult to remove without scoring the surfaces of the discs.

Prior art transducer positioning apparatus has normally been constructed with electromechanical actuating systems which lift the transducer out of operating position when the disc files are shut down and rotation thereof begins to diminish. Such systems work with moderate success on memory devices requiring a minimum of transducers. In memory devices requiring a large number of transducers used in connection with a number of large discs, each of which has a large number of information tracks, the cost of providing such retraction mechanism reaches a prohibitive level.

The present invention provides apparatus which may be employed with the disc file of a mass memory for positioning a plurality of transducers from a standby position to an operating position and then after the discs have been started and their proper rotating speed has been attained, the same apparatus applies physical force upon the transducers to counterbalance the laminar air flow and thus maintains the proper relationship between the recording gap of the transducer and the recording surface of the disc regardless of the shock, vibration or runout.

Briefly described, the present invention comprises a disc file memory system wherein a plurality of transducers are placed in a single shoe and a plurality of shoes are positionable to operate on the recording surfaces of each disc of the disc file. Mechanism is employed which actuates all the shoes simultaneously to three different positions; the first is a retracted position whereby the transducers are completely removed from physical contact with the disc when it is not rotating; thus, a shoe mounting plate, which holds the transducers required for the facing surfaces of a pair of discs, may be removed for inspection and/or repair. The second position is a starting or stopping position in which only a small amount of pressure is applied to the shoe. The third position in one in which a larger amount of force is applied to the shoe thus forcing it closer to the disc surfaces at higher rotational speeds of the discs.

It is one object of this invention to provide a disc file with a novel and improved transducer retraction mechanism which is reliable yet inexpensive.

It is another object of this invention to provide a disc file with novel and improved apparatus for ease in obtaining access to individual transducers without damage to the surfaces of the discs.

It is another object of this invention to provide a retraction mechanism that provides a number of different positions and/or forces applied to its transducer.

It is another object of this invention to provide a disc file which will have a longer life and increased reliability because of the reduced wear of the surface of its discs and the minimized recording and reading gap of its transducers.

It is another object of this invention to provide a disc file will accelerate to the desired rotational speed in a faster time and yet require a minimum amount of torque in doing so.

These and other objects will become apparent to those skilled in the art from the following detailed description of a preferred embodiment of the invention, illustrated in the accompanying sheets of drawings in which.

Figure 1:
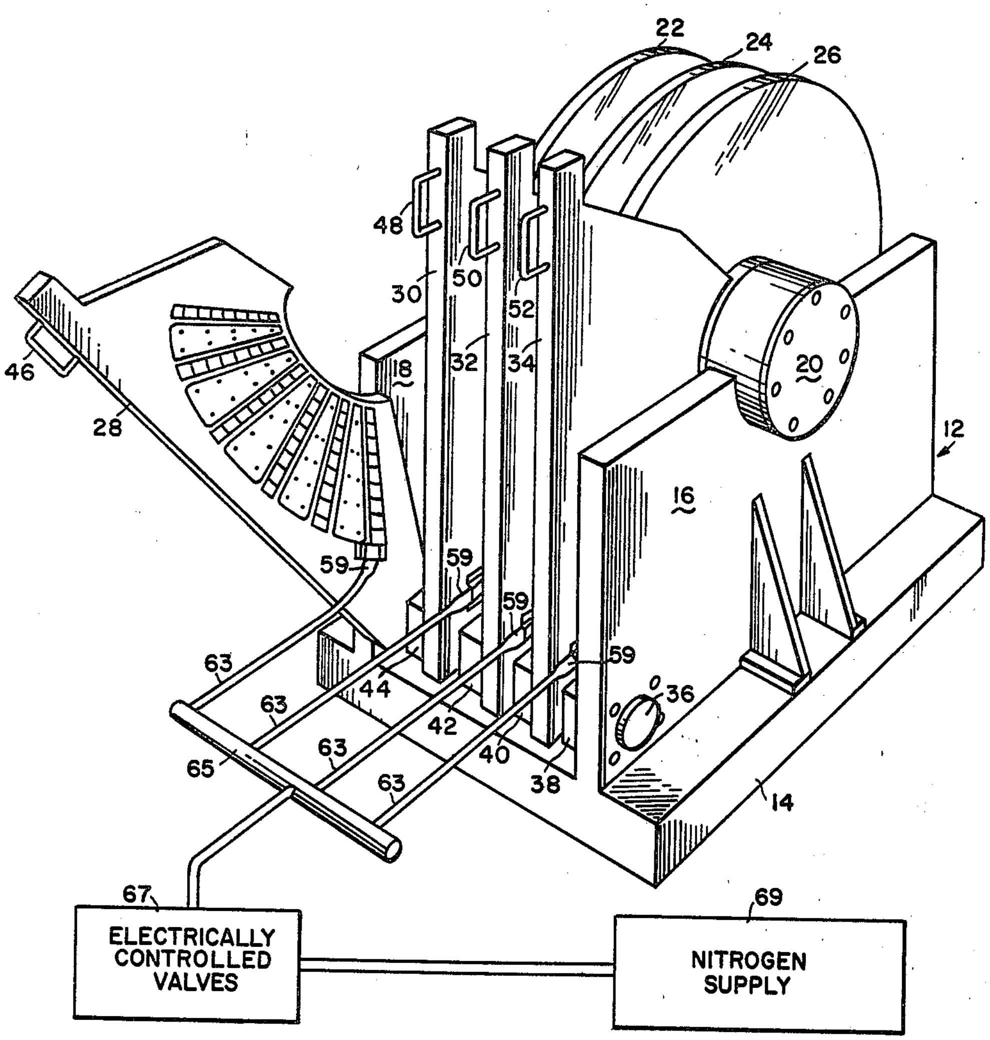
FIGURE 1 is a perspective view of a disc file showing one transducer mounting plate positioned for inspection and/or repair.

Turning now to a more detailed description of the present invention and particularly with reference to the drawing in FIGURE 1, the numeral 12 indicates generally a disc file unit consisting of a base 14 having upright portions 16 and 18. A spindle 20 is journaled upon upright portions 16 and 18 and mounted upon spindle 20 are three memory discs 22, 24 and 26 which are rotatable thereon by a motor which is not shown. The three discs are shown by way of example and it must be understood that more or fewer discs may be employed.

Coated on both surfaces of discs 22, 24 and 26 is a magnetizable material which is capable of having computer data stored thereon in the forms of discrete magnetized domains or "bits" in applied concentric tracks. Data may be recorded on the magnetic coatings on both sides of the discs.

Transducer mount plates 28, 30, 32 and 34 are pivotally mounted on a shaft 36 which is also journaled to the upright portions 16 and 18 of the base 14. Transducer mount plates 28, 30, 32 and 34 are spaced apart by spacers 38, 40, 42 and 44 so that they may be positioned between discs 22, 24 and 26 and also at the outer sides of discs 22 and 26 in order to support the transducer which transducer mount plates 28, 30, 32 and 34 to provide the dynamic transfer of information and to form the discs 22, 24 and 26 or the like.

Pull-down handles 46, 48, 50 and 52 are used for positioning the transducer mount plates 28, 30, 32 and 34 to their respective positions. Transducer mount plates 28, 30, 32 and 34 may be pulled out for inspection, cleaning and/or repair of defective transducers.

Figure 2:
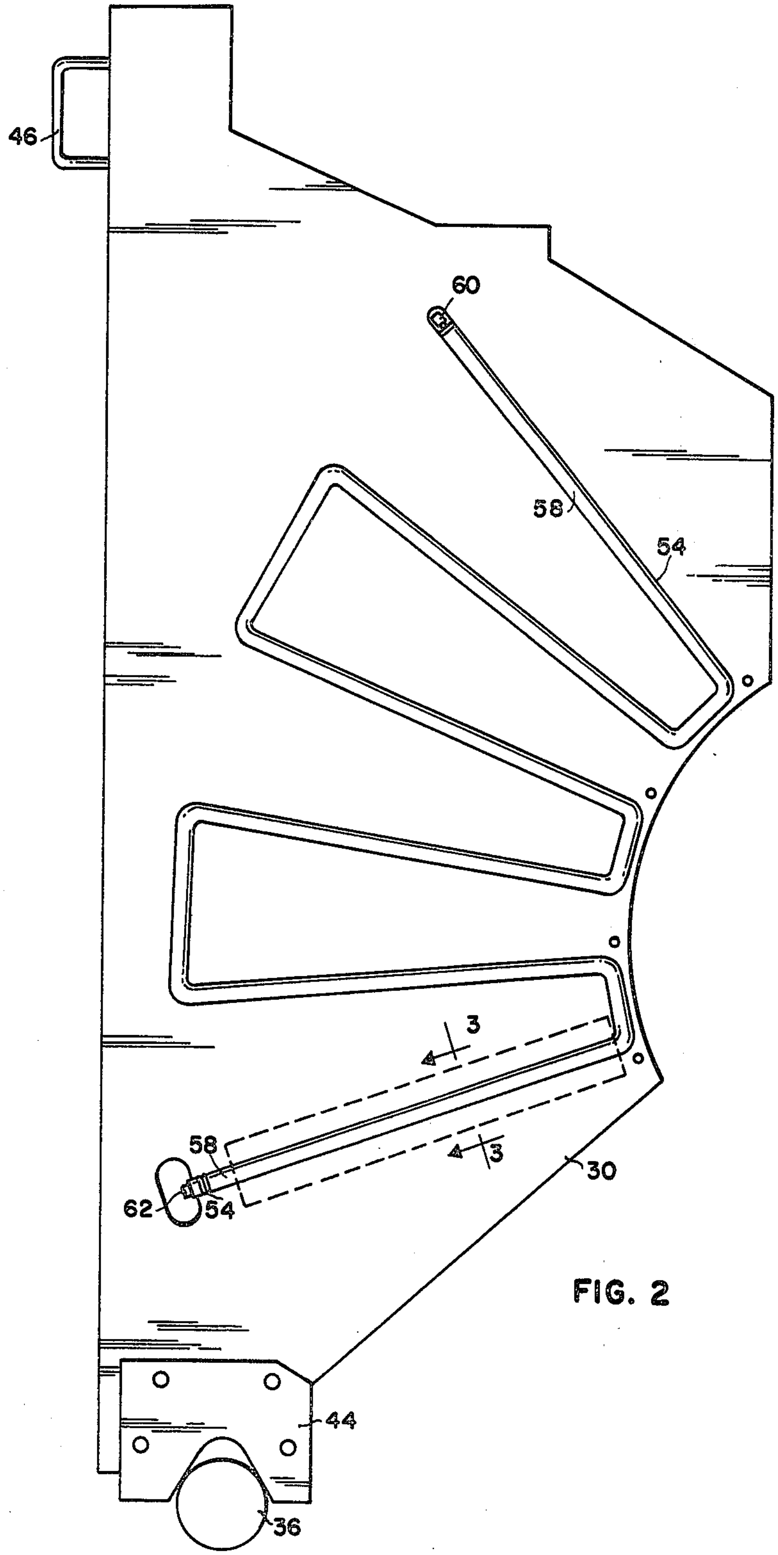
FIGURE 2 is an enlarged view of a transducer mounting plate with transducer mechanisms removed thereby depicting the positioning hose contained therein.

FIGURE 2 illustrates a typical transducer mount plate such as 28, 30, 32 or 34 removed from its operating position by being pivoted upon shaft 36. A groove 54 is cut in transducer mount plate 30, for example, and, as is shown in FIGURE 2, it extends in a serpentine path radially toward and away from the center of the disc; that is, groove 54 is cut back and forth in the transducer mount plate so that each back and forth groove is parallel to the radius of discs 22, 24 and 26. An expandable hose 58 is placed within the groove 54 and terminates at one end 60, which is sealed off and made airtight. The hose 58 may be made of a neoprene material and should be highly flexible and expandable in cross section when put under pressure. A fluid input is introduced into hose 58 at end 62 opposite end 60, and when fluid such as nitrogen, which is used in this case, is introduced into the fluid input end 62, the hose will expand and protrude out of the groove as will be seen later on in the description.

Bottled nitrogen was chosen as the supply of fluid for expanding the hose 58 because it eliminates the need for compressor mechanism and it is easily obtainable in bottles as an inert supply. Also, should a leak occur in a hose 58, the system would not have to be cleaned as it would were some other fluids used.

Figure 6:
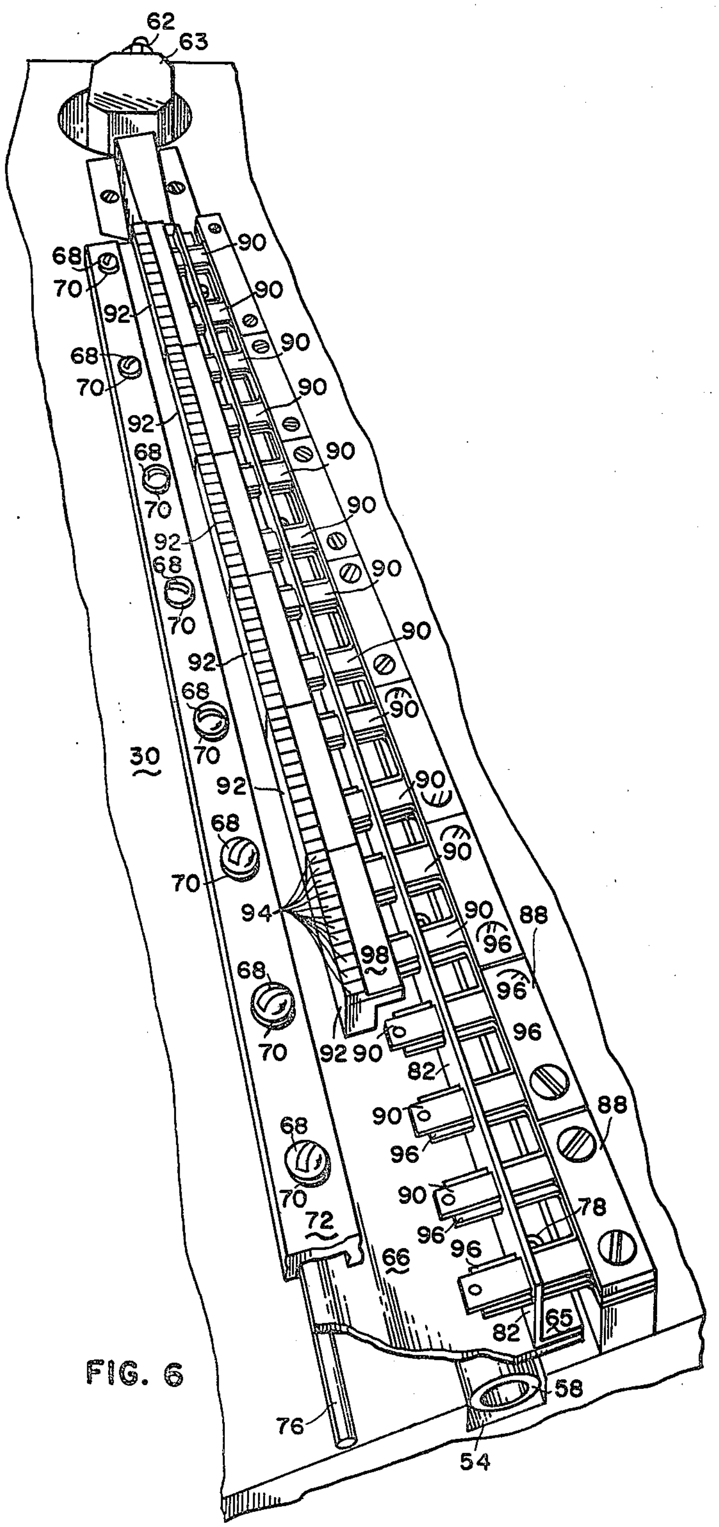
FIGURE 6 is a partial perspective view of an assembled transducer mounting plate.

It should be understood that each side of each transducer mount plate 28, 30, 32 or 34 which faces an adjacent surface of a memory disc 22, 24 or 26 carries transducers for that surface. Therefore, plates 30 and 32 will have transducers mounted on both sides. Thus each and every transducer mount plate has a hose coupling 59 coupled thereto for its supply of nitrogen. Plates 30 and 32 must have a common inlet manifold 61 (as seen in FIG. 6) mounted thereon for distributing the nitrogen to either hose 54 on both sides thereof. Input hoses 63 shown schematically in FIGURE 1 are coupled to hose coupling 59 and to a common hose or manifold 65 which is in turn coupled to an electrically controlled valve 67. Valve 67 determines the amount of nitrogen pressure that will be distributed to the hoses from the source 69 and may be manually controlled, or controlled by the computer with which the memory may be associated. The hose 58 may be inflated to different pressures for in order to place different forces upon transducers 74.

Figure 3:
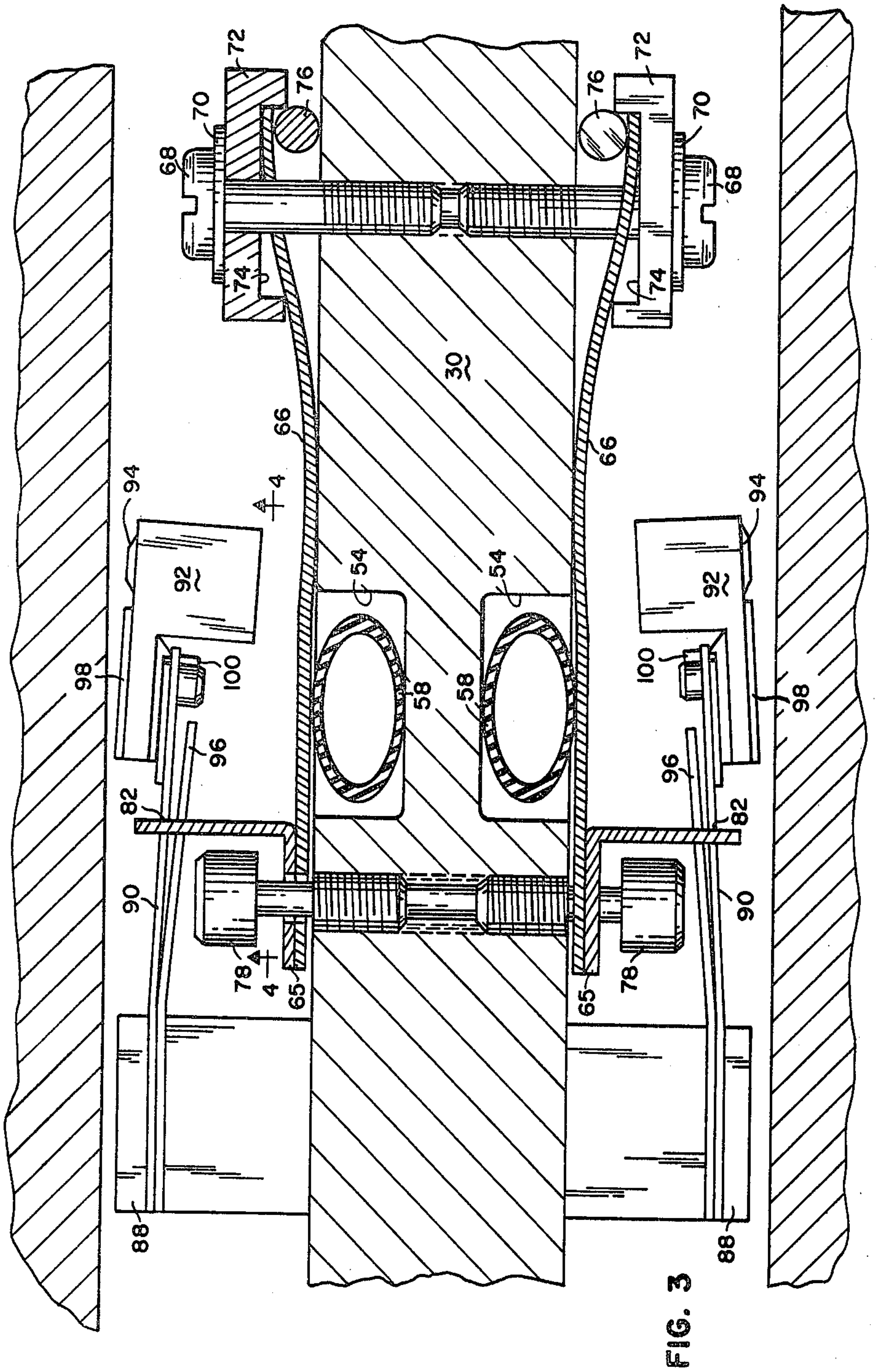
FIGURE 3 is a cross-sectional view taken along line 3—3 of FIGURE 2 illustrating the functional operation of the retraction mechanism.
Figure 5:
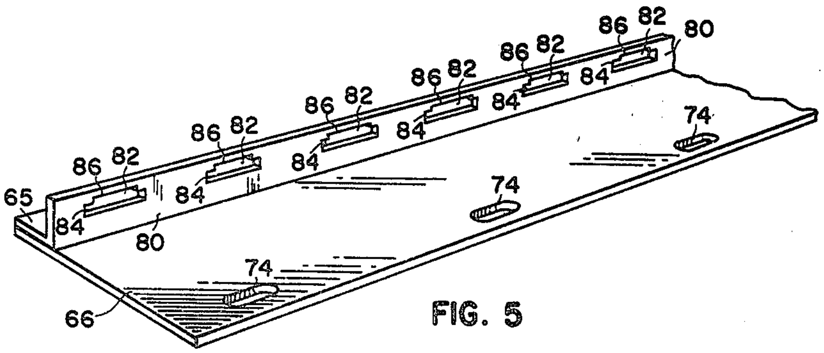
FIGURE 5 is a perspective view of the pressure plate used in conjunction with the retraction mechanism.

Turning now to FIGURE 3, there is shown a cross-sectional view of the mount plate 30. It can be seen by this view that a groove 54 is cut on each side of the transducer mount plate 30 thus showing that symmetrical equipment is required for association with adjacent surfaces of adjacent discs. Disposed over hose 58 is a pressure plate 66 (as better shown in FIGURE 5) which is affixed to the transducer mount plate 30 by the bolts and washers 68 and 70. As seen in FIGURE 3, the bolts 68 are threaded into the transducer mount plate 30 through an adjustment bar 72, through the pressure plate 66, and a hole 73 is provided therein. As can be seen from FIGURE 5, the hole 73 is elongated to provide for adjustment of the pressure plate parallel to the hose 58.

Referring to FIGURES 3 and 6, it can be seen that adjustment block 72 is provided with a channel 74 therein. Pressure plate 66 is placed under the channel 74 of the adjustment block 72 and a rod 76 is provided under end end 65 of the pressure plate 66. Thus as bolt 68 is screwed down, adjustment block 72 will tend to rock upon the rod 76, placing a force upon the pressure plate 66, thereby making it bear toward transducer mount plate 30.

Pressure plate 66 is adapted thereby to bear upon hose 58 inserted in groove 54 which is underneath the pressure plate 66. At the ledge of pressure plate 66 opposite the adjustment block 72 is a stop bolt 78 threaded into the transducer mount plate 30 through an opening in pressure plate 66. Thus when the hose 58 is inflated and expands, the pressure plate 66 will tend to raise off the transducer mount plate 30 toward the disc's surface.

End 65 of pressure plate 66 has a protrusion **66*a* extending at a right angle therefrom which has a plurality of slots 82 that are shaped with a large opening 84 on the bottom followed by a somewhat smaller opening 86** above the larger opening and formed, in effect, to a hat shape.

Mounted off the end 65 of the pressure plate 66 is a block 88 running parallel to the end 65 which is provided to hold leaf springs 90. Coupled to leaf springs 90 are shoes 92. Each shoe 92 has a plurality of transducers 94 attached to it. Also attached to block 88 is a plurality of auxiliary springs 96 which are, in effect, also leaf springs, not in any way connected to shoes 92, engagable to bear upon the leaf springs 90, as will be explained later in connection with FIGURES 7, 8 and 9.

Figure 4:
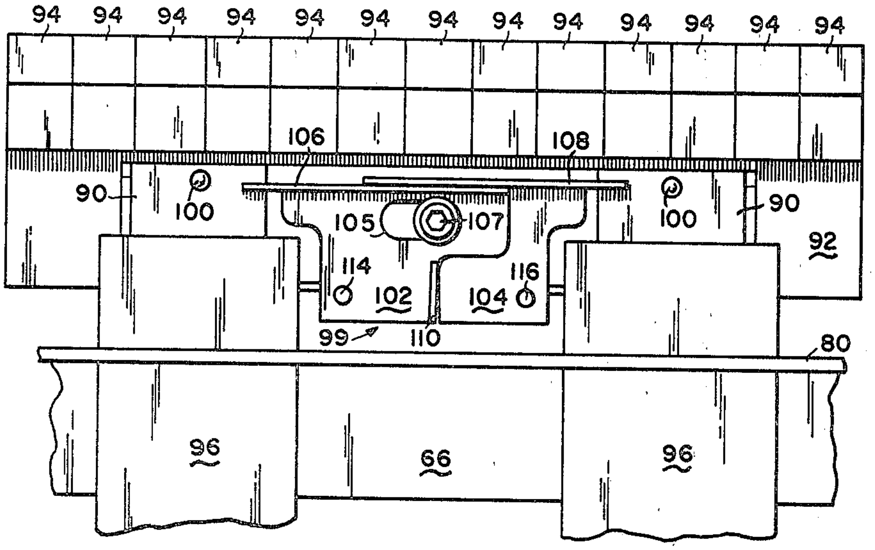
FIGURE 4 is a view of the transducer shoe taken along the line 4—4 of FIGURE 3.
Figure 10:
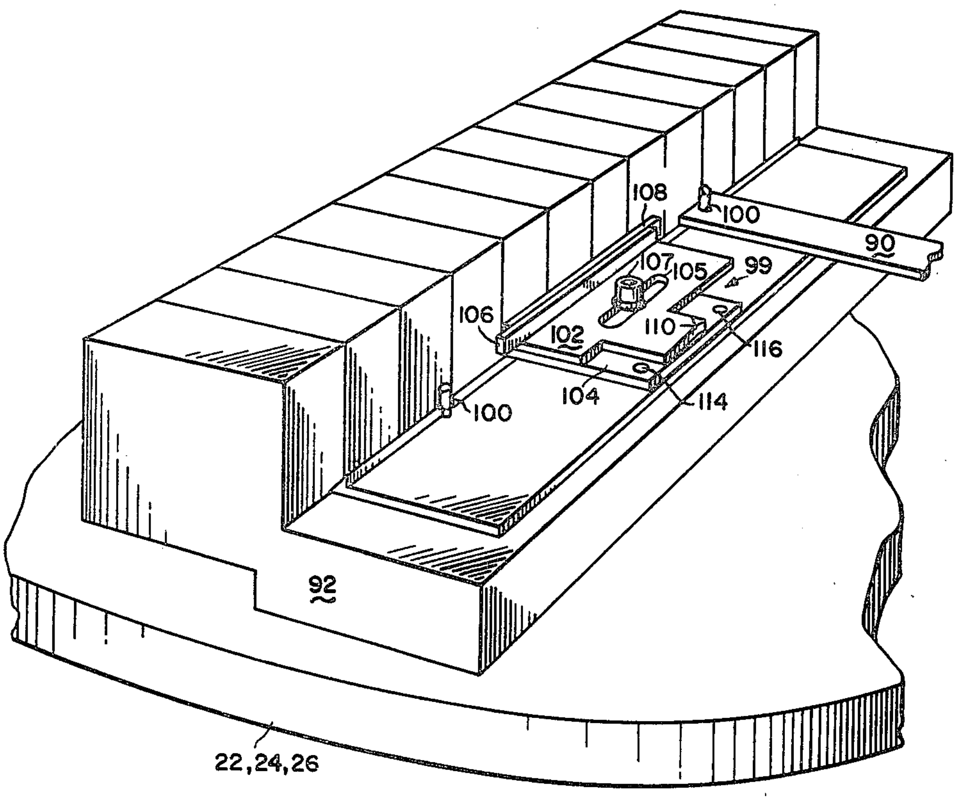
FIGURE 10 is a perspective view of a transducer shoe and the locking mechanism used therewith.

Referring now to FIGURES 4 and 10, each shoe 92 is provided in this embodiment to carry a total of 13 transducers, 12 of which may be operable for reading and writing of computer data upon the surface of a magnetizable disc. The 13th transducer in this particular embodiment is used as a spare but may be also used as a working transducer on a data track. The shoe 92, as shown in FIGURE 3, may have a bearing pad 98 thereon to increase the lift or flotation area of the shoe 92.

A locking mechanism 99, as shown in FIGURES 4 and 10, is provided to keep shoes 92 from dropping from positioning pins 100 when retracted to a standby position when the shoes 92 are off the surface of a disc. Locking mechanism 99 is positioned on shoe 92 between each pair of leaf springs 90 that coact to hold a single shoe 92 and is constructed of two parts 102 and 104 which slide in engagement with each other. Each part 102 and 104 has an arm 106 and 108, respectively, which is extendable over adjacent leaf springs 90. Each part 102 and 104 has an elongated slot 105 therein and a bolt 107 is provided through the slot and secured to the shoe 92. Thus it can be seen that lateral movement of parts 102 and 104 in opposite directions will place arms 106 and 108 over leaf springs 90 for securing them on the positioning pins 100 when the shoe 92 is in the retracted position, and they may be released for ease in removal of the shoe for inspection, cleaning, repair or replacement. Tip end 110 of the part 102 may be bent to provide enhanced locking action, and holes 114 and 116 may be provided to insert a tool, such as a pair of tweezers, for manipulating the locking mechanism.

When disc file 12 is in operation and the discs are rotating at their maximum speed, the arms 106 and 108 are not in contact with the leaf springs 90.

Operation

Figure 7:
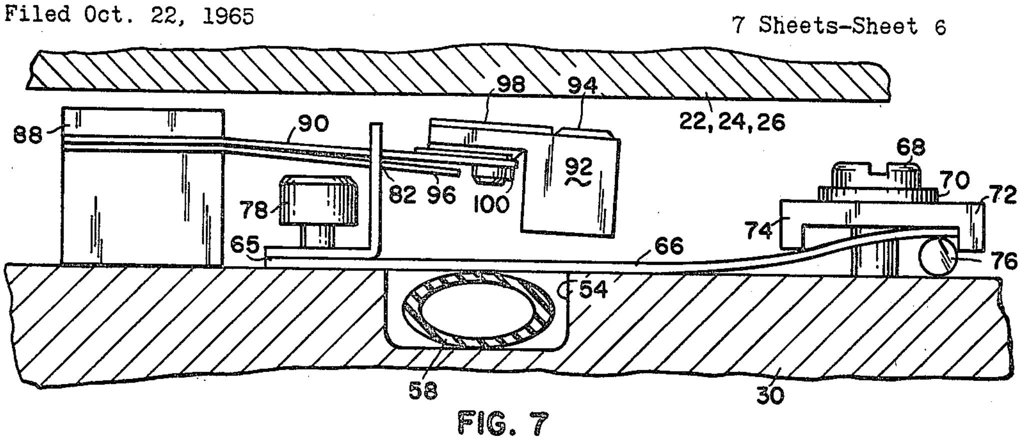
FIGURES 7, 8 and 9 illustrate sequential movement of mechanism for positioning the transducers with relation to a memory disc.
Figure 8:
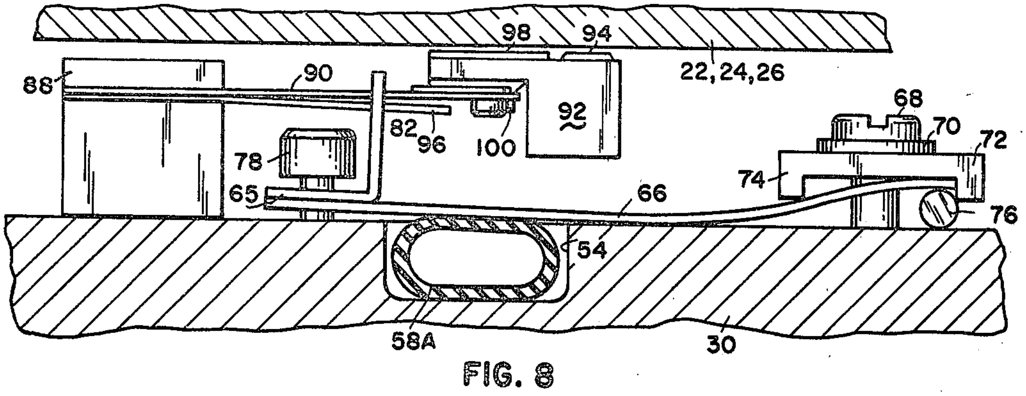
Figure 9:
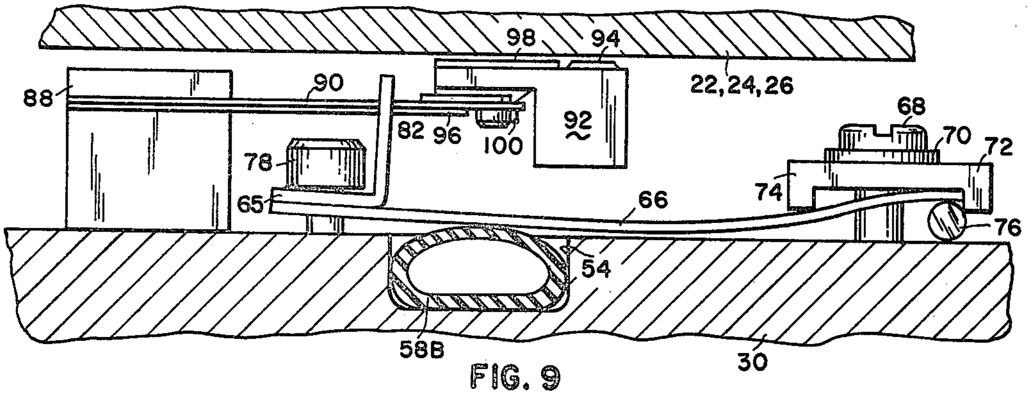

Referring now to FIGURES 7, 8 and 9 collectively, there is shown in FIGURE 7 a view in which shoe 92 is completely retracted from the surface of the disc. Hose 58 has no pressure therein and is completely retracted to its original shape, thus no lift is placed upon pressure plate 66. With shoe 92 in this retracted position, plates 30 in this particular example may be completely pulled out of operating position by pivoting them on shafts 36, as shown in FIGURE 1, for access to transducers 94 for their inspection or repair.

When the transducer mount plates 28, 30, 32 and 34 are positioned as in the showing of mount plates 30, 32 and 34, in FIGURE 1, they are in position for operation. FIGURE 8 illustrates hose 58 in its first operating position, thus when a certain amount of pressure is introduced into hose 58, and in the particular embodiment fifteen pounds was considered sufficient, pressure plate 66 is slightly raised toward the surface of the disc, thus releasing leaf spring 90 while the slots 82 still restrain auxiliary spring 96 as better depicted in FIGURES 5 and 6. In this position, the shoes 92 are lightly urged toward the disc surface. In a particular embodiment, the actual urging force may be only 20 grams, therefore the contact pressure between the disc and shoe 92 is negligible and thus causing virtually no wear or scoring of the magnetizable surface of the discs. As the discs now begin to rotate, the laminar air flow created upon the surface of the disc will immediately cause the transducers 94 in the shoes 92 to be supported on a thin, pneumodynamic film of air, out of contact with the recording surface of the disc.

FIGURE 9 illustrates the fully expanded position of hose 58. This position further raises pressure plate 66 completely against stop bolt 78, releasing any pressure placed upon the auxiliary springs 96 by the wider position 84 of slot 82; thus a greater amount of force (in the embodiment shown 300 grams was used) is placed upon the leaf springs 90 and the shoes 92 urging them toward the surface of the disc. This higher pressure is required when the disc is rotating at its optimum speed to overcome the greater amount of force created by any disc runout, shock and vibration.

Thus it can be seen that by the present invention three transducer positions are attainable. In the first, or fully retracted position the pressure plate 66 retracts shoes 92 well away from the surface of the discs 82 in the protrusion 80 pulling upon the springs 90 and 96. In the second position pressure plate 66 is slightly raised and the smaller portion 86 of the slot 82 is released from contact with leaf springs 90, allowing it to move with freedom upon its own force, thus moving it into its physical contact with the disc until the disc starts to rotate. Then it is slightly moved from the disc. As the disc increases in speed, this small amount of force that is placed upon the shoe 92 is overcome by the laminar air flow on the surface of the disc, thus the third step is needed to release a larger amount of force to provide stability to the shoe 92, and this is accomplished by the third step of completely releasing the pressure applied to auxiliary springs 96 by slot 84 in pressure plate 66 by fully expanding hose 58. Thus, when this force is released to auxiliary springs 96, the stability induced in thhe shoe 92 and transducer 94 allows a greater tolerance to disc runout and externally applied shocks and vibrations.

Having thus explained one embodiment of this invention, what is claimed is:

1. A data storage and retrieval system comprising: a plurality of magnetic memory discs rotatably mounted on a common axis; a plurality of transducer mounting plates, said plates pivotally mounted between adjacent discs for transverse movement across the surfaces of said discs; a plurality of transducers mounted on each of said plates and means for simultaneously positioning said transducers to a plurality of operating positions, each of said means including:

- a first spring member coupled to a transducer for forcing said transducer toward a disc surface;
- a second spring member positioned to cooperate with said first spring member in forcing said transducer toward said disc surface;
- a third spring member coupled to said first and second spring members for restraining the forces of said first and second members and for forcing said transducer from said disc surface, said third spring member having means for separately engaging said first and second spring members; and
- an expandable member positioned to cooperate with said third spring member to release the restraint upon said first spring member at a first stage of expansion and, upon further expansion of said expandable member, to release the restraint upon said second spring member.

2. A data storage and retrieval system, as set forth in claim 1, wherein said plates have a groove therein and a said expandable member is disposed in each said groove.

3. A data storage and retrieval system, as set forth in claim 1, wherein said expandable member is a flexible, expandable hose.

4. A data storage and retrieval system, as set forth in claim 1, wherein said expandable member is expanded by a fluid source.

5. In a mass memory system apparatus for stationing a plurality of transducer carrying members for operation with movable data storage surfaces comprising; a support plate, a resilient plate, one end of said resilient plate affixed to said support plate, said resilient plate having a right angle formed in the other end thereof; an expandable member associated with said support and disposed under said resilient member for engagement therewith, a plurality of spring means having one end firmly affixed to and spaced from said support, the other ends of each said spring means protruding through corresponding slots in said angle on said resilient plate, and a shoe associated with each said spring means, a plurality of cantilevers each associated with a spring means, each of said cantilevers affixed to said support with said spring means, and the free end of said cantilever protruding through said slots with said corresponding spring means and engageably operational with said corresponding spring means, and means for expanding and retracting said expandable member.

References Cited

UNITED STATES PATENTS

| | | | |
|---|---|---|---|
| 3,124,660 | 3/1964 | Criner | 340—174.1 |
| 3,320,599 | 5/1967 | Billawala | 179—100.2 |

BERNARD KONICK, Primary Examiner

WILLIAM F. WHITE, Assistant Examiner

U.S. Cl. X.R.

179—100.2